United States Patent [19]

Boehmer

[11] Patent Number: 5,099,878
[45] Date of Patent: Mar. 31, 1992

[54] TUBE MOUNTED LOW PRESSURE CHECK VALVE

[75] Inventor: Dennis A. Boehmer, Xenia, Ohio

[73] Assignee: Vernay Laboratories, Inc., Yellow Springs, Ohio

[21] Appl. No.: 699,215

[22] Filed: May 13, 1991

[51] Int. Cl.⁵ .............................................. F16K 15/06
[52] U.S. Cl. ................................................ 137/533.29
[58] Field of Search ............ 137/515.5, 533.21, 533.29

[56] References Cited

U.S. PATENT DOCUMENTS

| | | |
|---|---|---|
| 97,485 | 12/1869 | Dawson . |
| 209,975 | 11/1878 | Morey . |
| 491,957 | 2/1893 | Welsh ............................ 137/533.29 |
| 1,778,092 | 10/1930 | Tallman . |
| 2,130,053 | 9/1938 | White . |
| 2,155,124 | 4/1939 | Gibbons ..................... 137/533.29 X |
| 2,372,629 | 3/1945 | Nelson . |
| 2,483,572 | 10/1949 | Cater . |
| 3,435,839 | 4/1969 | Elder . |
| 3,451,067 | 6/1969 | Jordan . |
| 3,530,880 | 9/1970 | Hune . |
| 3,739,801 | 6/1973 | Rudolph . |
| 3,812,542 | 5/1974 | Shiley . |
| 3,858,246 | 1/1975 | Milo . |
| 4,257,445 | 3/1981 | Cook et al. . |
| 4,556,084 | 12/1985 | Frawley . |
| 4,646,772 | 3/1987 | Bergsma . |
| 4,749,003 | 6/1988 | Lesson . |
| 4,751,940 | 6/1988 | Bergsma et al. . |
| 4,753,262 | 6/1988 | Bergsma . |
| 4,907,616 | 3/1990 | Bergsma . |
| 4,960,153 | 10/1990 | Bergsma . |
| 4,966,199 | 10/1990 | Ruschke . |

*Primary Examiner*—Robert G. Nilson
*Attorney, Agent, or Firm*—Biebel & French

[57] ABSTRACT

A low restriction valve is provided for mounting to the end of a tube. The valve includes a valve body formed of an elastomeric material which may flex to conform to the shape of the end of the tube to thereby form a seal between the valve and the tube. In addition, a regulator portion is provided and includes a disk portion and a stem extending from the disk into the valve body. The disk is movable in a direction parallel to the longitudinal axis of the valve body such that the disk may move from a position spaced from an end of the valve body allowing fluid flow to a position in contact with the end of the valve body to prevent back flow of fluid.

14 Claims, 3 Drawing Sheets

FIG·1

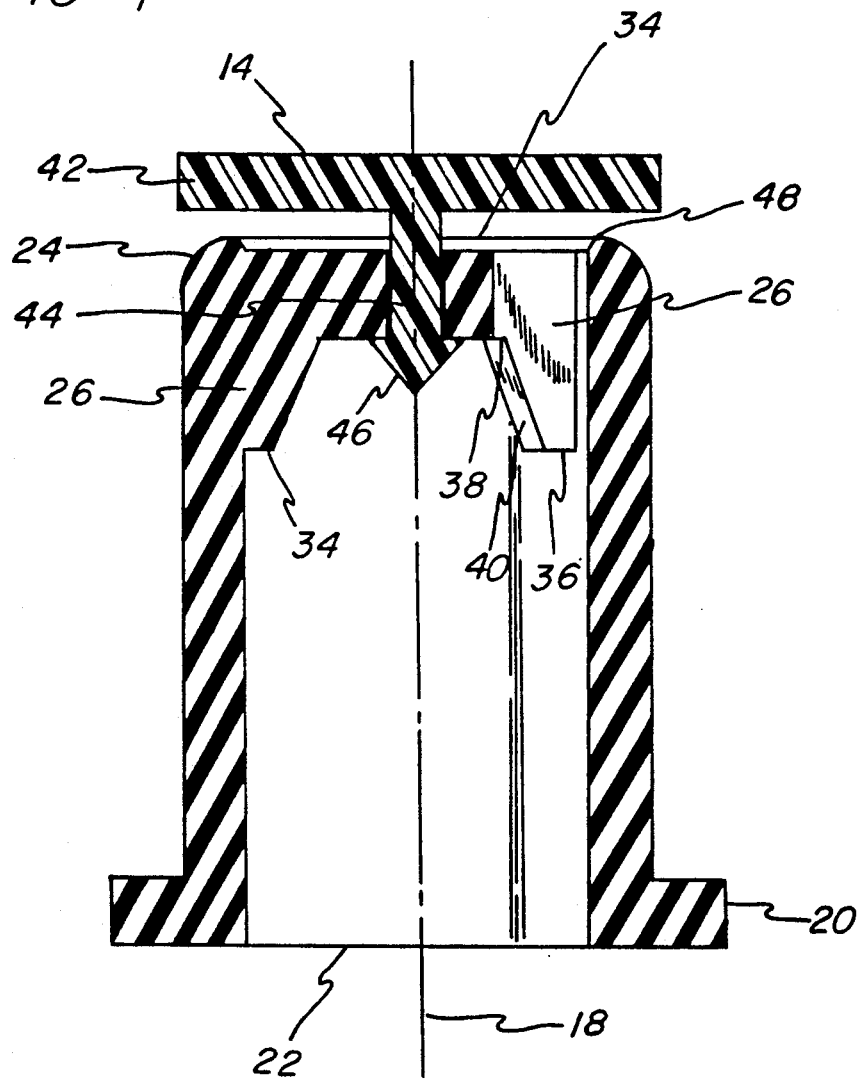

TUBE MOUNTED LOW PRESSURE CHECK VALVE

BACKGROUND OF THE INVENTION

The present invention relates generally to a flow regulation apparatus, and more particularly, to a one-way check valve which will open and close at very low differential pressures in order to prevent flow in a first direction and to allow flow in a second direction.

Automotive fuel systems typically incorporate a one-way check valve on the end of a fuel return tube within the vehicle gas tank. In a typical automotive fuel system, fuel is pumped through a supply tube to a fuel chamber at the engine in quantities in excess of that required by the engine. The excess fuel is returned to the fuel tank by way of the fuel return line and the one-way valve at the fuel tank end of the return line insures that if suction should be applied to the return line from the engine, or if the line should be damaged in the event of an accident, fuel will be prevented from flowing to the engine via the return line.

Several different check valves have been used to prevent back flow through the return line, such as a duckbill valve attached to the end of the tube. While this valve effectively controls flow of fuel through the tube, under certain conditions it may produce an undesirable noise as the fuel is returned to the fuel tank.

In another prior art valve, a plastic disk is retained within a cage attached to the end of the return tube and the disk moves toward the end of the tube to seal off the end of the tube when a negative pressure is applied to the tube. However, such a valve structure does not insure that a complete seal will be provided at the end of the tube and may not respond quickly to prevent back flow under all operating conditions.

In addition, the end of the fuel return tube may be out of round or have machining marks which interfere with sealing of the valve to the tube in certain prior art valves which are formed with body portions made of plastic materials.

Accordingly, there is a need for a one-way check valve which may be easily attached to the end of a fuel return tube and which will permit quiet forward flow of fluid through the tube. Further, there is a need for such a valve in which a small reverse flow pressure will cause the valve to close to substantially prevent all fluid flow through the return tube in a reverse direction.

SUMMARY OF THE INVENTION

The present invention is a valve assembly for attachment to the end of a tube wherein the valve prevents fluid flow into the tube in a first direction and allows fluid flow out of the tube in a second direction.

The valve includes an elastically resilient cylindrical body portion which defines a central longitudinal axis of the valve as well as opposing first and second valve ends. A plurality of spoke elements are formed integrally with the second end of the valve and extend radially inwardly toward the central axis where they attach to a hub portion which is formed integrally with the spoke elements. The hub portion is formed with a centrally located aperture which is aligned with the longitudinal axis.

A regulator portion comprising a substantially planar disk is positioned over the second end and an elongated stem portion extends from the disk and through the aperture in the hub portion. The stem portion includes a stop at an end thereof distal from the disk and the stop is formed with a radius greater than the radius of the stem for engaging a surface of the hub to prevent the removal of the regulator portion from the valve.

The stem is movable relative to the hub portion such that the disk may move from a position in sealing contact with the second end of the body portion to a second position in spaced relation to the second end of the body portion. Thus, when the disk is in its first position it will prevent fluid flow in the first direction through the valve and when the disk is in its second position it will allow fluid flow through the valve.

The valve further includes a ledge portion which is axially spaced from the hub portion and extends radially inwardly from the body portion toward the axis. The ledge portion defines a surface which is oriented in substantially orthogonal relationship to the axis for abutting the end of a tube which is inserted through the first end of the valve. In this manner, the ledge portion prevents the tube from being inserted an excessive distance into the valve which may interfere with the proper operation of the valve.

Other objects and advantages of the invention will be apparent from the following description, the accompanying drawings, and the appended claims.

BRIEF DESCRIPTION OF THE DRAWINGS

FIG. 4 is a cross-sectional elevational view similar to that of FIG. 3 in which the valve is shown in an open position.

DETAILED DESCRIPTION OF THE PREFERRED EMBODIMENT

Figure 1:
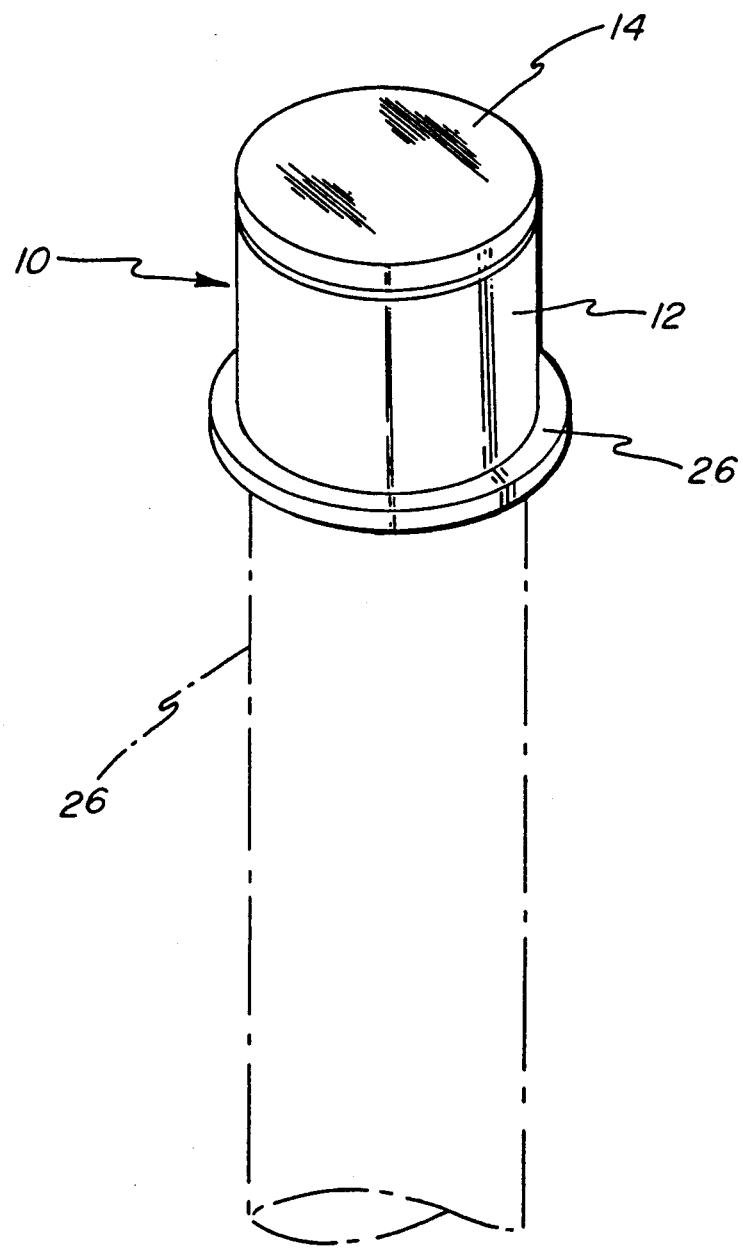
FIG. 1 is a perspective view of the valve in postion on a tube.

The valve assembly of the present invention, generally designated 10, includes a valve body portion 12 formed of an elastomeric or elastically resilient material and a regulator portion 14, as seen in FIG. 1. The valve 10 is shown attached to the end of a tube 16 in the same manner that the valve 10 might be used in an automotive fuel system return line.

Figure 2:
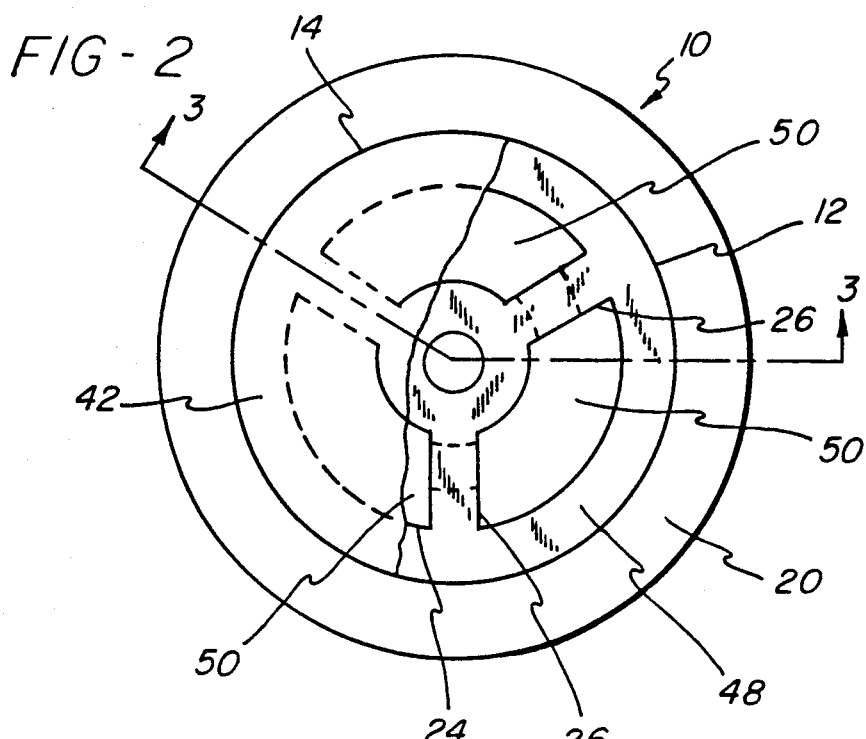
FIG. 2 is a top plan view of the valve with a portion of the regulator disk cut away.
Figure 3:
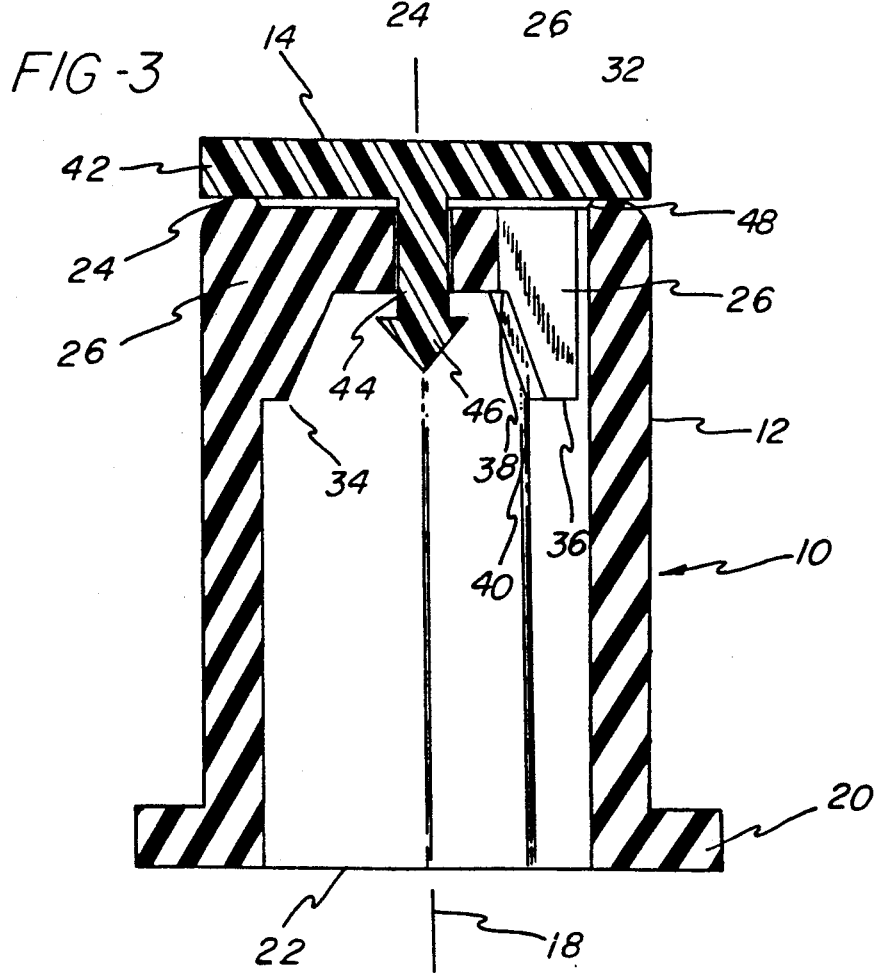
FIG. 3 is an elevational view taken along line 3—3 in FIG. 2 showing the valve in a closed position.

Referring to FIGS. 2-4, the valve body portion 12 is formed as a cylindrical member defining a central longitudinal axis 18 and includes a flange portion 20 extending radially outwardly from a first end 22 of the body portion 12. The flange portion 20 reinforces the body portion 12 to facilitate retention and sealing of the valve 10 to a tube 16 through frictional forces.

The body portion 12 further defines a second end 24 thereof which includes a plurality of spoke portions 26 extending radially inwardly from a smooth interior surface of the body portion 12 toward the central axis 18. The spoke portions 26 are preferably formed integrally with the body portion 12 and are connected to a central hub portion 28 formed integrally with the spoke portions 26. The hub portion 28 includes means defining an aperture 30 which is aligned with the longitudinal axis 18.

The spoke portions 26 each include a first spoke portion side 32 which lies substantially in a single plane and a second spoke portion side 34 which is formed with surfaces defining a stepped configuration. The second spoke portion side 34 includes a ledge portion surface 36 and a hub connection surface 38 wherein the ledge portion surface and the spoke connection surface 38 define axially spaced planes oriented orthogonally to the longitudinal axis 18. The two surfaces 36, 38 are connected by a transition surface 40 which extends radially inwardly from the first end 22 to the second end 24 of the valve body 12. Thus, the transition surface 40 is oriented at an angle relative to a plane defined by the first spoke portion side 32.

By forming the spoke portions 26 with a width dimension, as measured in a direction parallel to the longitudinal axis, which is greater adjacent to the body portion 12, a reinforced area is provided for the ledge surfaces 36 whereby the ledge surfaces 36 will be sufficiently rigid to engage the end of a tube 16 in abutting contact to thereby limit the inward movement of the tube into the valve 10.

The valve 10 further includes a regulator portion 14 which is preferably formed of a relatively rigid plastic material. The regulator portion 14 includes a substantially planar disk 42 having a diameter approximately equal to or slightly greater than the diameter of the body portion 12, and a stem portion 44 extending from one surface of the disk 42 and passing through the hub aperture 30. A stop portion 46 is formed at an end of the stem 44 distal from the disk 42, and the stop 46 is formed with a radius greater than the radius of the stem as well as greater than the radius of the aperture 30 such that the stop 46 will prevent the regulator portion 14 from being removed from the hub portion 28 during outward movement of the regulator portion 14. In addition, the stem portion 44 is formed with a sufficient length such that the disk 42 may move out of contact with a raised annular lip 48 at the second end 24 of the valve body 12 to a position in spaced relation to the valve body 12, as seen in FIG. 4.

As may be seen in FIG. 2, the spoke portions 26 define apertures 50 around the hub portion 28 which apertures 50 are configured as segments of an annulus for allowing passage of fluids through the valve 10.

In use, the body portion 12 of the valve 10 is pushed onto the end of a tube 16 such as a fuel return tube for an automobile. When mounted, the valve 10 is typically in an inverted postion with the second end 24 facing downwardly such that the disk 42 will hang in spaced relation to the annular portion 48 with the stop 46 engaged against the inner surface of the hub 28. When a negative pressure or a reverse flow condition exists within the valve 10, the disk 42 will be drawn into sealing engagement with the annular portion 48 to prevent flow of fuel or vapors through the return tube 16. It should be noted that the present valve 10 is designed to operate in response to differential pressures as small as 1 inch of water such that the valve will be actuated very quickly in response to changes in flow direction. Further, by providing a disk element 42 which moves into spaced relationship away from the valve body 12, a relatively unrestricted flow path is provided for fluids flowing in a forward direction such that objectionable noises are substantially eliminated during flow of fluids through the valve 10.

When the valve 10 is used in a fuel system application, the body portion, spoke portions and hub portion are preferably formed from a fluorosilicone material which is resistant to fuel and which retains its elastic characteristics in cold temperatures.

In addition, the regulator portion may be formed of a relatively rigid or inflexible plastic material which is resistant to fuel. Acceptable materials for forming the regulator portion include acetal copolymers such as Celcon produced by Hoechst Celanese Corporation of Somerville, N.J., or acetal resins such as Delrin produced by DuPont of Wilmington, Del.

The present valve may also be used in other applications such as water filtration systems in which high back pressure forces are encountered. The rigid disk 14 is resistant to valve pressure forces as high as 150 psi. Thus, the present valve may be used in high pressure applications where conventional valves having a flexible regulator portion may experience failure.

In applications such as installation in water filtration systems, the body portion of the valve may be formed of an ethylene propylene polymer.

It should be apparent from the above description that the present valve may be easily installed on the end of a tube with a minimum of labor and tools. Further, the interior of the body portion 12 is formed with a substantially smooth surface such that surface contact with the exterior of a tube is maximized to insure proper frictional engagement between the valve and the tube.

It should also be noted that by providing an elastomeric material for the body portion 12, the valve 10 may be easily mounted onto tubes which are out of round or which have machining defects such that the formation of an effective seal is not dependent on the particular characteristics of the end of the tube to which the valve is mounted.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A valve for controlling fluid flow in a first and a second direction comprising:
   a resilient cylindrical body portion defining a central longitudinal axis of said valve, and opposing first and second valve ends;
   spoke portions formed integrally with said second valve end and extending radially inwardly from said body portion toward said axis;
   said body portion being formed with a smooth interior surface defining a substantially constant interior diameter from said first end to said spoke portions;
   a hub portion formed integrally with said spoke portions and including means defining an aperture, said longitudinal axis passing through said aperture;
   a regulator portion comprising a substantially planar disk and an elongated stem portion extending from said disk, said stem portion including a stop at an end thereof distal from said disk and said stop being formed with a radius greater than the radius of said stem; and
   wherein said stem is movable relative to said hub portion such that said disk may move from a position in contact with said second end of said body portion preventing fluid flow in a first direction to a second position in spaced relation to said second end of said body portion allowing fluid flow in a second direction through said valve, said stop being out of contact with said hub portion in said first position and said stop moving toward said hub portion during movement to said second position.

2. The valve of claim 1 wherein said spoke portions define opposed first and second spoke portion sides, said first spoke portion side substantially lying in a single plane and said second spoke portion side having surfaces defining a stepped configuration such that at least two axially spaced planes are defined by said surfaces of said second side.

3. The valve of claim 2 wherein said surfaces of said second spoke portion side are connected by a transition surface which angles radially inwardly from said first to said second end of said body portion.

4. The valve of claim 1 wherein said spoke portions include opposed first and second sides, said first side substantially lying in a first plane and said second side including surfaces which angle radially inwardly from said first to said second end of said body portion.

5. The valve of claim 1 wherein said spoke portions define apertures around said hub portion for passage of fluids, said apertures being configured as segments of an annulus and said spoke portions including surfaces extending radially inwardly in a direction from said first end toward said second end and oriented at an angle relative to a plane defined by a surface on an opposing side of said spoke portions.

6. The valve of claim 1 wherein said spoke portions define a width dimension in a direction parallel to said longitudinal axis and said width dimension of each of said spoke portions decreases from said body portion to said hub portion.

7. The valve of claim 1 wherein said spoke portions define ledge portions adjacent to said body portion, said ledge portions being axially spaced from said hub portion and forming a stop for seating against the edge of a tube inserted into said body portion.

8. The valve of claim 1 wherein said body portion, hub portion and spoke portions are formed of an elastomeric material.

9. The valve of claim 8 wherein said disk is formed of a relatively rigid plastic.

10. A valve for controlling fluid flow in a first and a second direction comprising:

a substantially cylindrical body portion defining a central longitudinal axis of said valve, and opposing first and second valve ends;

spoke portions extending radially inwardly from said body portion toward said axis, said spoke portions defining fluid passages at said second end of said valve;

a hub portion formed integrally with said spoke portions and including means defining an aperture, said longitudinal axis passing through said aperture;

a regulator portion including a disk portion and and elongated stem portion extending from said disk portion and passing through said aperture in said hub portion for holding said regulator portion in position adjacent to said second end of said valve; and a ledge portion axially spaced from said hub portion and extending radially inwardly from said body portion toward said axis, said ledge portion defining a surface oriented in substantially orthogonal relationship to said axis for abutting the end of a tube inserted through said first end of said valve.

11. The valve of claim 10 wherein said spoke portions define opposed first and second spoke portion sides, said first spoke portion side substantially lying in a single plane and said second spoke portion side having surfaces defining a stepped configuration such that at least two axially spaced planes are defined by said surfaces of said second side.

12. The valve of claim 11 wherein said ledge portion is formed by one of said surfaces of said second spoke portion side.

13. The valve of claim 12 wherein said surfaces of said second spoke portion side are connected by a transition surface which angles radially inwardly in a direction from said first end toward said second end of said body portion.

14. The valve of claim 10 wherein said body portion, said spoke portions and said hub portion are formed of an elastomeric material and said regulator portion is formed of a relatively rigid plastic.

* * * * *